United States Patent [19]

Itaba et al.

[11] Patent Number: 5,006,378

[45] Date of Patent: Apr. 9, 1991

[54] POLYETHYLENE COMPOSITE FILM

[75] Inventors: Yasushi Itaba, Tokyo; Yutaka Yoshifuji, Saitama; Takayoshi Kondo, Tokyo; Minoru Izawa, Saitama; Ichiro Sakamoto, Kanagawa; Tadao Yoshino, Saitama, all of Japan

[73] Assignee: Toa Neryo Kogyo Kabushiki Kaisha, Tokyo, Japan

[21] Appl. No.: 268,498

[22] Filed: Nov. 8, 1988

[30] Foreign Application Priority Data

Nov. 13, 1987 [JP] Japan .................. 62-285433
Nov. 20, 1987 [JP] Japan .................. 62-291952

[51] Int. Cl.$^5$ ............ B32B 7/02; B32B 7/08; B65B 53/00
[52] U.S. Cl. .................. 428/34.9; 428/516; 428/910; 428/349; 428/461; 428/476.1; 428/483; 428/473.5; 428/509; 428/513; 428/523
[58] Field of Search ............ 428/910, 212, 516, 34.9

[56] References Cited

U.S. PATENT DOCUMENTS

| 4,410,582 | 9/1983 | Tsunashima et al. | 428/212 |
| 4,652,490 | 3/1987 | Arita et al. | 428/910 X |
| 4,741,957 | 5/1988 | Park | 428/910 X |
| 4,7705,714 | 11/1987 | Itaba et al. | 428/212 X |

FOREIGN PATENT DOCUMENTS 60-171149 9/1985 Japan .

*Primary Examiner*—George F. Lesmes
*Assistant Examiner*—D. R. Zirker
*Attorney, Agent, or Firm*—Wenderoth, Lind & Ponack

[57] ABSTRACT

A polyethylene composite film suitable for packaging, which is superior in moistureproofness, flex-o-crack resistance, tearability and heat-sealing property, is provided comprising an oriented polyethylene film such that the degree of cross-linking inwardly decreases across the thickness of the film and at least one lamination layer, provided on one side of the oriented polyethylene film consisting of a lamination material having a heat shrinkage of less than 5% at 120° C.

18 Claims, No Drawings

POLYETHYLENE COMPOSITE FILM

BACKGROUND OF THE INVENTION

1. Field of the Invention

This invention relates to a polyethylene composite film suitable for packaging, which is superior in moisture-proofness, flexocracking resistance, tearability and heat sealability.

2. Description of the Prior Art

Up to the present time, as conventional packaging films have been known three layer structures each consisting of a surface layer of a heat resisting material such as paper, polyethylene terephthalate film (PETP), biaxially oriented polypropylene film (OPP), cellophane, oriented polyamide film (OPA) or the like, an intermediate layer of a gas barrier material such as saponified ethylene-vinyl acetate copolymer film (saponified EVA), aluminum foil (Al) or the like, and a sealant layer. However, these surface layers meet with the problems that the flexocracking resistance, moisture-proofness and tearability are not sufficient to make up the performance of the intermediate layer and the surface layers need provision of sealant layers in uses, for example, gusset bags in which surface layer materials must have sealability each other, thus resulting in increase of the production cost, since the surface layers have no sealability.

On the other hand, a polyethylene film excellent in moisture proofness, clarity and tearability has been proposed which is crosslinked and oriented in such a manner that the degree of crosslinking is specified in the thickness direction (Japanese Laid-Open Publication Nos. 174321/1984 and 174322/1984). However, this crosslinked and oriented polyethylene film has excellent properties as a packaging film, but the heat sealability of this film itself or a laminated film using this film as a sealant is not always sufficient, in particular, in the case of making a heat-sealed bag by contacting the film with a heat sealing bar at a high temperature at a high speed.

Furthermore, a polyethylene composite film has also been proposed which consists of a crosslinked and oriented polyethylene film excellent in moistureproofness and clarity, having a specified degree of crosslinking in the thickness direction of the film, and a sealant layer of a low density polyethylene (Japanese Patent Laid-Open Publication No. 171149/1985). However, this polyethylene composite film has also a disadvantage in the heat sealability of the films one another.

As a film with a good tearability, cellophane or longitudinally or laterally monoaxially oriented polyethylene film (MOPE) has been known. However, the cellophane surely has a good self tearability property, but the straight line tearability is not good, and the monoaxially oriented polyethylene film has the disadvantage that the straight line tearability is good, but a clear tearability is hardly obtained because of tendency of occurrence of fibrils during cutting.

A standing pouch using a packaging film, of the conventional packagings, needs the straight line tearability. To this end, for example, there have been proposed laminated films with lamination structures of polyester film (PET film)/aluminum foil (Al foil)/MOPE film/non-oriented polypropylene film (CPP film) and PET film biaxially oriented nylon film (O-Ny film)/MOPE film/low density polyethylene film (LDPE film). However, these laminated films have also disadvantage of occurrence of fibrils and accordingly, it has eagerly been desired to develop a packaging film with more excellent linear and clear tearability.

SUMMARY OF THE INVENTION

It is an object of the present invention to provide a polyethylene composite film having excellent properties, whereby the disadvantages of the prior art can be overcome.

It is another object of the present invention to provide a polyethylene composite film suitable for packaging, which is superior in moistureproofness, flexocracking, resistance, tearability and heat sealability.

These objects can be attained by a polyethylene composite film comprising an oriented polyethylene film such that the degree of crosslinking inwardly decreases across the thickness of the film and at least one lamination layer, provided on one side of the oriented polyethylene film, consisting of a lamination material having a heat shrinkage of at most 5% at 120° C., in particular, 5% at 140° C.

DETAILED DESCRIPTION OF THE INVENTION

The inventors have made studies to develop a polyethylene composite film suitable for packaging and consequently, have found that the use of an oriented polyethylene film such that the degree of crosslinking inwardly decreases across the thickness of the film is effective. The present invention based on this finding.

Accordingly, the present invention provides a polyethylene composite film comprising (A) an oriented polyethylene film (hereinafter referred to as "BOPE" film simply) such that the degree of cross-linking inwardly decrease across the thickness of the film and at least one (B) lamination layer, provided on one side of BOPE film, consisting of a lamination material having a heat shrinkage of less than 5% at 120° C. (hereinafter referred to as "lamination material" simply).

In preferred embodiments of the present invention, (i) one side of the lamination material is provided with (C) a sealant layer, (ii) one side of the lamination material is provided with the BOPE film and (iii) the other side of the BOPE film (A) is provided with (C) a sealant layer.

In the present invention, the BOPE film as a basic or substrate layer is a biaxially oriented polyethylene film in which the degree of crosslinking decreases inwardly from each surface of the film reaching a minimum near the middle of the film. The degree of crosslinking is expressed in terms of gel fraction defined by the quantity of insoluble matters which are left undissolved when a sample is extracted with boiling p-xylene. The gel fraction is 0 to 5% in the middle layer portion where the degree of crosslinking is lowest and the gel fraction is 5% or more, preferably 20 to 70% in the opposite surface layer portions where the degree of crosslinking is highest. More preferably, both the outer layer portions have a same degree of crosslinking and there are formed crosslinked layer/uncrosslinked layer/crosslinked layer in the thickness direction of the film, the ratio of uncrosslinked layer: each crosslinked layer being 1:0.1 to 10. The draw ratio should preferably be greater than 3 times in one direction. That is, the stock sheet is preferably stretched biaxially with an area magnification of greater than 9 times.

The above described BOPE film is suitably selected depending on the use. When a moistureproofness, tearability and bending pinhole proofness are required, for example, it is preferable to use a high density polyethylene base with a density of at least 0.935 g/cm$^3$.

This BOPE film has superior properties, in particular, a water vapor transmission rate (Y) (JIS Z 0208, temperature 40° C., relative humidity 90%) of lower than a numerical value obtained from the following formula, $$Y = 17X^{-1}$$

in which Y represents the water vapor transmission rate (g/m$^2$/24 hours) and X represents the thickness (μm) of the oriented film, and a haze value of lower than 5%.

When using the BOPE film as a sealant layer, a linear low density polyethylene capable of maintaining less curled a laminated film and heat sealing at a low temperature can be used as a raw material.

The thickness of the BOPE film is selected suitably depending on the object and use, but generally in the range of about 10 to 200 μm. The BOPE film can be coated with aluminum by vapor deposition or with polyvinylidene chloride (PVDC) called K-coat.

The above described BOPE film can be produced by processes, for example, disclosed in Japanese Patent Laid-Open Publication Nos. 174322/1984 and 74819/1986, incorporated herein by reference. Polyethylene with various densities can be used therefor and from the standpoint of improving the moistureproofness, it is preferable to use, for example, polyethylenes having a density of at least 0.935 g/cm$^3$, a melt index (JIS K 6760, measured at a temperature of 190° C. and a load of 2.16 kg, referred to as "MI") of 0.5 to 20 g/10 min and a ratio of high load melt index (JIS K 6760, measured at a temperature of 190° C. and a load of 21.6 kg, referred to as "HLMI")/MI in the range of 40 to 200. Furthermore, petroleum resins of hydrogenation type are preferably added thereto and these polyethylenes can be used in combination. Such a high density polyethylene is fed to a commonly used extruder and formed into a flat or tubular stock sheet by melt extrusion, crosslinked by irradiating both the surfaces of the stock sheet with electron beam in such a manner that the degree of crosslinking inwardly decreases in the thickness direction of the stock sheet, and then biaxially stretched at a temperature of lower than the melting point of polyethylene.

As the lamination material in the present invention, there can be used paper, Al foil, cellophane, heat resisting resin films, etc. Examples of the paper are coated papers, bleaching wrapping papers, wrapping tissues, converted papers for smoothly planed boards or food vessels and the like. The Al foil has preferably a thickness of about 7 to 12 μm. As the cellophane, those of about 22 μm thick are preferably used. Examples of the heat resisting resin films are those of polyesters, polyamides, polyimides, polyparabanic acids, ethylene-polyvinyl alcohol copolymers, polypropylene (OPP) and the like. Among these heat resisting resin films, PET films are particularly preferable from the standpoint of heat resistance and bag or pouch making speed. The heat resisting resin film has preferably a thickness of about 12 to 50 μm.

The basic structure of the polyethylene composite film according to the present invention consists in a laminated film comprising (A) the BOPE film as a basic or substrate layer and (B) at least one of the lamination layers of paper, Al foil or heat resisting resin film. In this case, moreover, the other side of the lamination layer can be provided with (C) a sealant layer.

The other basic structure of the polyethylene composite film according to the present invention consists in a laminated film comprising (A) the BOPE film as a basic or substrate layer, (B) at least one of the lamination layers provided on one side of the BOPE film and (C) a sealant layer provided on the other side of the BOPE film. In this case, moreover, a barrier layer such as of Al foil, etc. can be provided between the BOPE film (A) and the lamination layer (B) or the sealant layer (C).

For the sealant layer (C) of the present invention, low density polyethylene (LDPE), linear low density polyethylene (LLDPE), ethylene-vinyl acetate copolymer (EVA), ethylene-ethyl acrylate copolymer (EEA), ionomer, polypropylene (non-oriented film), etc. can be used and these are suitably chosen depending on the use. The sealant layer has preferably a thickness of about 10 to 50 μm.

In the present invention, lamination of the BOPE film (A) as a basic layer with the lamination material (B) such as paper, Al foil, cellophane or heat resisting resin film or with the sealant layer (C) can be carried out by any of (1) wet laminate method, (2) hot melt laminate method, (3) dry laminate method and (4) extrusion coating laminated method.

The thickness of the thus laminated polyethylene composite film, which should suitably be chosen depending on the object and use, is generally in the range of about 20 to 300 μm.

The polyethylene composite film of the present invention has advantages that heat sealing the BOPE films each other is possible, the moistureproofness, linear or clear tearability and flexocracking resistance are excellent and a sufficient heat sealing strength can be given without shrinkage even when contacted with a heat sealing bar at a high temperature at a high speed. By combination with the various lamination materials, these effects or functions can further be increased. In the combination with Al foil, for example, the moistureproofness can further be improved while making up the pinhole resistance of the Al foil. In the combination with paper, an appearance characteristic of the paper is given while further increasing the moistureproofness of the paper. In addition, the BOPE film can be given a cold glue sealability of paper. In the combination with a lamination material having a gas barrier property, such as ethylene-polyvinyl alcohol copolymer, the gas barrier property at a high temperature and high humidity can be improved. In the combination with PET or cellophane, the optical property can be given.

The polyethylene composite film of the present invention is useful as various packaging materials because of the excellent properties as described above, in particular, gusset bags or cases materials using the BOPE film as a surface layer, bags using the BOPE film as a sealing layer, packaging materials for standing pouches, raw materials for making bags at a high speed, etc. Furthermore, the composite film of the present invention can be used for making other bags such as fashion bags and pouches, and vessels such as trays, containers, boxes, cartons, tubes, paper wears, etc.

In particular, the polyethylene composite film of the present invention can favorably be applied to production of laminated tubes, easy open trays, containers, cases, easily tearable pouches and paper wears.

For example, a laminated tube is produced by shaping into a tubular form a polyethylene composite film consisting of an Al foil or ethylene-vinyl alcohol copolymer film both the surfaces of which are coated with relatively thick BOPE films with a thickness of about 80 μm or another composite film consisting of this polyethylene composite film both the surfaces of which are further provided with sealant layers such as those of LLDPE and LDPE, bonding the side connection part and bottom by heat-sealing or using an adhesives and then bonding to the top a cover having an opening for discharging a content. The thus resulting tube is composed of less laminated layers and excellent in pinhole proofness, which can favorably be used for drugs, cosmetics, foods, adhesives, etc.

An easy open tray or container is produced by forming into a tray or container a polyethylene composite film consisting of a relatively thick BOPE film with a thickness of about 80 μm and an ethylene-vinyl alcohol copolymer (EVAL) film in such a manner that the BOPE film be inside to function as a sealant layer and combining a cover consisting of a composite film having a sealant layer of LLDPE, LDPE or PP, such as LDPE/EVAL/BOPE film by heat-sealing the BOPE film surface and sealant layer surface to obtain a packaging vessel, which is very useful as a food vessel because of having excellent gas barrier property, moistureproofness, pinhole proofness and clarity and further easily opening.

An easily tearable pouch is produced by a method comprising combining the polyethylene composite films of the present invention in such a manner that the sealant layers are faced each other and making a bag, characterized in that a number of cuts are provided are previously provided at the sealing parts of this bag at a constant interval in same directions and then heat-pressing and bonding the sealing parts at a temperature of higher than the melting point of the sealant.

A paper wear is generally composed of an outer layer consisting of an oriented polyethylene film such that the degree of crosslinking inwardly decreases across the thickness of the film and an inner layer consisting of a paper, the sealing parts being bonded with an adhesives.

EXAMPLES

The following examples are given in order to illustrate the present invention in detail without limiting the same. Test methods employed herein are as follows:
(1) Water Vapor Transmission Rate
JIS Z 0208, temperature 40° C., relative humidity 90%
(2) Haze
JIS K 6714
(3) Heat Sealing Strength
JIS Z 0238
(4) Heat Shrinkage Two test pieces (10 mm width ×350 mm length, taken in the longitudinal and lateral directions) marked at 10 mm length and 310 mm length were allowed to stand in a thermostat using air at 140° C. or 120° C. for 10 minutes and the heat shrinkages of these test pieces were obtained from the length of the test piece $L_o$ before heating and the length $L_1$ after heating by the following relationship:

Heat Shrinkage $= [(L_0 - L_1)/L_0] \times 100$ (5) Gel Fraction
ASTM D 2765, Method A
(6) Number of Pinholes after Flexocracking
Using a Gelvoflex Tester—commercial name—made by Rigaku Kogyo KK, the number of pinholes of a test piece were counted after bending the test piece 100 times at 440° angle reciprocation/cycle and 40 cycles/min.
(7) High Temperature Heat Sealing Property The state of a sealed part at a heat sealing bar temperature of 200° C. was observed to give results indicated by no shrinkage O, somewhat shrinkage Δ and marked shrinkage x.
(8) Tearability When cutting I-type notch by hands, a linearly cut sample was indicated by O and others by x. When cutting, a sample giving a clear cut section was indicated by O, a sample giving a slightly notched section by Δ, and others by x (Examples 1 to 18, Comparative Examples 1 to 8).
(9) Tearability When cutting I-type notch by hands, a linearly cut sample was indicated by O and others by x. When cutting, a sample giving a clear cut section free from fibrils was indicated by O and another sample meeting with occurrence of fibrils, by x (Examples 19 to 26 and Comparative Examples 9 to 12).

PREPARATION OF BOPE FILM (1) High density polyethylene (density: 0.957 g/cc, MI: 1.0 g/10 min, melting point: 154° C. (134° C.) was fed to a T-die extrusion sheet shaping machine and shaped in a flat stock sheet with a thickness of 480 μm (600 μm). Both the surfaces of this stock sheet were irradiated by electron beam of 20 Mrad under conditions of 150 KV (165 KV)-8 mA using an electron beam irradiator (made by ESI Co.) in a nitrogen atmosphere.

The gradient of the degree of crosslinking across the thickness of the stock sheet was estimated in the following manner. 24 pieces (30 pieces) of 20 μm thick films were laid on top of another to make a 480 μm (600 μm) thick test piece, which was then irradiated under the same conditions as described above. After irradiation, the test piece was taken apart and the degree of crosslinking of the individual films was examined to find that the maximum gel fraction was 50% in the outer irradiated layer and the minimum gel fraction was 0% in the inner layer. The irradiated stock sheet was found to be composed of a crosslinked outer layer/uncrosslinked inner layer/crosslinked outer layer, the ratio of their thickness being 1:1.75:1.

The crosslinked stock sheet was heated at 120° C. and then stretched 4 times (400% by length) in the longitudinal direction and 6 times (600% by length) in the lateral direction sequentially by using a tenter-type biaxial stretching machine, thus obtaining a 20 μm (25 μm) thick oriented film BOHD-1 (BOHD-3) having the properties as shown in Table 1 (Table 2).

The data described in the parentheses correspond to those of BOHD-3.

(2) An oriented film BOHD-2 was obtained in the same manner as in the above described production of the film BOHD-1, except changing the dosage of electron beam in 15 Mrad. The properties of BOHD-2 are shown in Table 1.

(3) An oriented film BOLL was obtained in the same manner as in the above described production of the film BOHD-1, except using linear low density polyethylene (density: 0.924 g/cm$^3$, MI: 2.0 g/10 min) instead of the high density polyethylene and changing the dosage of electron beam in 10 Mrad. The properties of the resulting film BOLL are shown in Table 1.

(4) Oriented films BOHD-4 and BOHD-5 were obtained in the same manner as in the above described production of the film BOHD-3 except changing the stretching temperature, draw ratio in longitudinal direction (MD) and lateral direction (TD) and stock sheet thickness as shown in Table 2. The properties of these films BOHD-4 and BOHD-5 are shown in Table 2.

commercial name), (4) PETP film (12 $\mu$m), (5) Cellophane (22 $\mu$m), (6) Al vapor deposited PETP film (12 $\mu$m), (7) LDPE film (30 $\mu$m), (8) LLDPE film (30 $\mu$m), (9) OPP film (20 $\mu$m)

The above described lamination materials (1) to (6) had a heat shrinkage at 140° C. of less than 5%. The above described basic layers and lamination materials

TABLE 1

| BOPE Films | Degree of Crosslinking of Stock Sheet | | | | Stretching Conditions | | Oriented Film | | |
|---|---|---|---|---|---|---|---|---|---|
| | Crosslinked Layer: Uncrosslinked Layer: Crosslinked Layer (ratio) | Gel Fraction | | | Temperature (°C.) | Draw Ratio (MD × TD) | Thickness ($\mu$) | Water Vapor Transmission Rate (g/m²/24) | Haze (%) |
| | | Irradiated Surface (%) | Minimum (%) | Irradiated Surface (%) | | | | | |
| BOHD-1 | 1:1.75:1 | 50 | 0 | 50 | 127 | 4 × 6 | 20 | 3.6 | 2.7 |
| BOHD-2 | 1:1.75:1 | 35 | 0 | 35 | 125 | 4 × 6 | 20 | 3.3 | 4.0 |
| BOLL | 1:1.75:1 | 25 | 0 | 25 | 120 | 4 × 6 | 20 | 14.0 | 1.5 |

TABLE 2

| BOHD Films | Stock Sheet Thickness ($\mu$m) | Stretching Temperature (°C.) | Draw Ratio (MD × TD) | Film Thickness ($\mu$m) | Haze (%) | Water Vapor Transmission Rate (g/m²/24 hr) |
|---|---|---|---|---|---|---|
| BOHD-3 | 600 | 127 | 4 × 6 | 25 | 2.9 | 2.9 |
| BOHD-4 | 600 | 129 | 6 × 4 | 25 | 3.3 | 3.2 |
| BOHD-5 | 480 | 127 | 4 × 6 | 20 | 2.7 | 3.6 |

EXAMPLES 1 TO 18 AND COMPARATIVE EXAMPLES 1 TO 8

Basic Layer: (1) BOHD-1 film, (2) BOHD-2 film, (3) BOLL film

Lamination Layer: (1) Fine paper (50 g/m²), (2) Al foil (9 $\mu$m), (3) EVAL-F (15 $\mu$m, made by Kurarey Co., were combined so as to give layer structures as shown in Table 3, and bonded and laminated by a wet lamination method using adhesives of EVA emulsion type or acrylic type, a dry lamination method using adhesives of urethane type or an extrusion coating lamination method. The properties of these composite films are shown in Table 3.

TABLE 3

| Example No. | Layer Structure of Film (basic layer/lamination material) | Lamination Method | Heat Sealing Strength (kg/15 mm) | |
|---|---|---|---|---|
| | | | BOPE side | Sealant side |
| 1 | BOHD-1/Paper | Wet Lami. (EVA type) | 0.75 | — |
| 2 | BOHD-1/Paper/LDPE | Dry Lami. (Urethane type)/Extrusion Lami | 0.75* | 1.2 |
| 3 | BOHD-1/Al/LLDPE | Dry Lami. (Urethane type)/Dry Lami. (Urethane type) | 0.75* | 2.7 |
| 4 | BOHD-1/Al deposited PETP/LLDPE | Dry Lami. (Urethane type)/Dry Lami. (Urethane type) | 0.75* | 3.0 |
| 5 | BOHD-1/EVAL/LDPE | Dry Lami. (Urethane type)/Dry Lami. (Urethane type) | 0.65* | 2.8 |
| 6 | BOHD-1/PETP | Dry Lami. (Urethane type) | 0.7 | — |
| 7 | BOHD-2/PETP | " | 0.9 | — |
| 8 | BOLL/PETP | " | 1.0 | — |
| 9 | BOHD-1/Al/PETP | Dry Lami. (Urethane type)/Dry Lami. (Urethane type) | 0.7 | — |
| 10 | BOHD-1/Al/Paper | Dry Lami. (Urethane type)/Wet Lami. (Acrylic type) | 0.6 | — |
| 11 | BOHD-1/Cellophane | Dry Lami. (Urethane type) | 0.65 | — |
| 12 | PETP/Al deposited.BOHD-1 | " | 0.7 | — |
| 13 | BOHD-1/Paper/BOHD-1 | Dry Lami. (Urethane type)/Dry Lami. (Urethane type) | 0.75 | — |
| 14 | BOHD-1/PETP/BOHD-1 | Dry Lami. (Urethane type)/Dry Lami. (Urethane type) | 0.7 | — |
| 15 | BOHD-1/Al/BOHD-1 | Dry Lami. (Urethane type)/Dry Lami. (Urethane type) | 0.7 | — |
| 16 | BOHD-1/Al/BOHD-1/LLDPE | Dry Lami. (Urethane type)/Dry Lami. (Urethane type)/Dry Lami. (Urethane type) | 0.7 | 2.8 |
| 17 | BOHD-1/EVAL/BOHD-1 | Dry Lami. (Urethane type)/Dry Lami. (Urethane type) | 0.6 | — |
| 18 | LLDPE/BOHD-1/Al/BOHD-1/LLDPE | Dry Lami./Dry Lami./Dry Lami./Dry Lami. | — | 3.0 |
| Comparative Example | | | | |

TABLE 3-continued

| | | | | |
|---|---|---|---|---|
| 1 | BOHD-1 | — | impossible (shrink) | — |
| 2 | PETP/LDPE | Extrusion Lami. | impossible | 1.0 |
| 3 | Paper/LDPE | " | " | 1.1 |
| 4 | PETP/Al/LDPE | Dry Lami. (Urethane type)/Dry Lami. (Urethane type) | " | 1.3 |
| 5 | PETP/Paper/LLDPE | Dry Lami. (Urethane type)/Dry Lami. (Urethane type) | " | 3.0 |
| 6 | PETP/Al/LLDPE | Dry Lami. (Urethane type)/Dry Lami. (Urethane type) | " | 3.0 |
| 7 | BOHD-1/LDPE | Extrusion Lami. | impossible (shrink) | 1.1 |
| 8 | BOHD-1/OPP | Dry Lami. (Urethane type) | impossible (shrink) | — |

| Example No. | Water Vapor Transmission Rate ($g/m^2/24$ hrs) | Pinholes due to Flexocracking (No./$m^2$) | Tearability Linear | Tearability Clear |
|---|---|---|---|---|
| 1 | 3.6 | 0 | o | Δ |
| 2 | 3.2 | 0 | o | o |
| 3 | 0.4 | 0 | o | o |
| 4 | 0.5 | 0 | o | o |
| 5 | 3.1 | 0 | o | o |
| 6 | 3.4 | 0 | o | o |
| 7 | 3.2 | 0 | o | o |
| 8 | 12 | 3 | o | Δ |
| 9 | 0.4 | 0 | o | o |
| 10 | 0.4 | 0 | o | Δ |
| 11 | 3.5 | 0 | o | o |
| 12 | 0.5 | 0 | o | o |
| 13 | 1.5 | 0 | o | Δ |
| 14 | 1.4 | 0 | o | o |
| 15 | 0.5 | 0 | o | o |
| 16 | 0.5 | 0 | o | o |
| 17 | 1.4 | 0 | o | o |
| 18 | 0.4 | 0 | o | o |
| Comparative Example | | | | |
| 1 | 3.6 | — | o | o |
| 2 | 18 | 45 | x | Δ |
| 3 | 25 | 70 | x | x |
| 4 | 0.4 | 35 | x | Δ |
| 5 | 12 | 26 | x | Δ |
| 6 | 0.4 | 30 | x | Δ |
| 7 | 3.1 | 1 | o | o |
| 8 | 2.1 | 0 | o | o |

Note:
*Heat Sealing Strength before laminating sealant layer.

EXAMPLES 19 TO 26 AND COMPARATIVE EXAMPLES 9 TO 12

Basic Layer: (1) BOHD-3 and BOHD-4 films, (2) Al vapor deposited BOHD-5 film (Al vapor deposition 600 Å), (3) K-coat BOHD-5 film, (4) Polyethylene monoaxially oriented film (made by Toyo Kagaku Co., Caralian —commercial name—, 25 μm), (5) Polyethylene monoaxially oriented film (made by Tokyo Cellophane Paper Co., Tocello O-PE —commercial name— 25 μm, hereinafter referred to as OPE)

Lamination Material: (1) Fine paper (50 g/$m^2$), (2) Polyethylene terephthalate film (PETP, 12 μm), (3) Al foil (9 μm), (4) OPP film (20 μm)

The above described lamination materials (1) to (4) had a heat shrinkage at 120° C. of less than 5%.

Sealant Layer: LDPE film (20 μm), LLDPE film (30 μm), CPP film (25 μm)

The above described basic layers, lamination materials and sealant layer were combined so as to give layer structures as shown in Table 4, and bonded and laminated by a wet lamination method using adhesives of EVA emulsion type or acrylic type, a dry lamination method using adhesives of urethane type, an extrusion coating lamination method or an extrusion sandwiching lamination method. The properties of these composite films are shown in Table 4.

TABLE 4

| Example No. | Layer Structure of Film (Lamination Material/ Basic Layer/Sealant Layer) | Lamination Method |
|---|---|---|
| 19 | PETP/BOHD-3/LDPE | Dry Lamination/Extrusion Lamination |
| 20 | PETP/Al deposited.BOHD-5/CPP | Dry Lamination/Dry Lamination |
| 21 | PETP/K coat.BOHD-5/LLDPE | " |
| 22 | PETP/Al/BOHD-4/CPP | Dry Lami./Dry Lami./Dry Lami. |
| 23 | Paper/BOHD-4/Al/LDPE | Wet Lami./Dry Lami./Dry Lami. |
| 24 | Paper/BOHD-3/LDPE | Dry Lamination/Extrusion Lamination |
| 25 | OPP/BOHD-1/LDPE | " |

TABLE 4-continued

| | | |
|---|---|---|
| 26 | EVAL/BOHD-3/LDPE | " |
| 9 | PETP/Caralian/LDPE | Sandwich Lami./Extrusion Lami. |
| 10 | PETP/Al/Caralian/CPP | Dry Lami./Dry Lami./Dry Lami. |
| 11 | PETP/Al/OPE/CPP | " |
| 12 | BOHD-3/LDPE | Extrusion Lamination |

| Example No. | Heat Sealability | | Water Vapor Transmission Rate (g/m²/24 hrs) | Tearability | |
|---|---|---|---|---|---|
| | Strength (kg/15 mm) | High temperature Heat Seal Property | | Linear | Clear |
| 19 | 1.0 | o | 2.5 | o(1) | o(1) |
| 20 | 2.7 | o | 0.5 | o(1) | o(1) |
| 21 | 3.0 | o | 1.5 | o(1) | o(1) |
| 22 | 2.6 | o | 0.4 | o(2) | o(2) |
| 23 | 2.8 | o | 0.4 | o(2) | o(2) |
| 24 | 1.3 | o | 2.6 | o(1) | o(1) |
| 25 | 1.2 | Δ | 1.8 | o(1) | o(1) |
| 26 | 1.2 | Δ | 2.5 | o(1) | o(1) |
| 9 | 1.1 | o | 3.3 | o(1) | x |
| 10 | 2.7 | o | 0.4 | o(1) | x |
| 11 | 2.7 | o | 0.4 | o(2) | x |
| 12 | 1.1 | x | 2.6 | o(1) | o |

[Note]
(1): T D direction
(2): M D direction

What is claimed is:

1. A polyethylene composite film comprising an oriented polyethylene film such that the degree of crosslinking inwardly decreases across the thickness of the film and at least one lamination layer, provided on one side of the oriented polyethylene film, consisting of a lamination material having a heat shrinkage of less than 5% at 120° C., said oriented polyethylene film being crosslinked to form a structure of a crosslinked layer/uncrosslinked layer/crosslinked layer across the thickness of the film, wherein the crosslinked layer has a gel fraction of 20 to 70% and the uncrosslinked layer has a gel fraction of 0%; the ratio of the uncrosslinked layer: crosslinked layer being 1:0.1 to 10, said oriented polyethylene film further having a water vapor transmission rate (Y) of lower than a numerical value obtained from the following formula:

$$Y = 17X^{-\frac{1}{2}}$$

in which Y represents the water vapor transmission rate (g/m²/24 hours) and X represents the thickness (μm) of the oriented film, and a haze of at most 5%, wherein said lamination material is selected from the group consisting of papers, aluminum foils, cellophanes and heat resisting resins selected from the group consisting of polyesters, polyamides, polyimides, polyparabanic acids and ethylene-vinyl alcohol copolymers.

2. The polyethylene composite film as claimed in claim 1, wherein the lamination layer is provided, on the surface thereof, with a sealant layer.

3. The polyethylene composite film as claimed in claim 1, wherein the lamination layer is provided, on the surface thereof, with an oriented polyethylene film such that the degree of crosslinking inwardly decreases across the thickness of the film.

4. The polyethylene composite film as claimed in claim 1, wherein the oriented polyethylene film is provided, on the other side thereof, with a sealant layer.

5. The polyethylene composite film as claimed in anyone of claims 1 to 4, wherein the oriented polyethylene film is obtained by stretching a stock sheet with a draw ratio of at least 3 times in one direction.

6. The polyethylene composite film as claimed in anyone of claims 1 to 4, wherein the oriented polyethylene film has a thickness of 10 to 200 μm.

7. The polyethylene composite film as claimed in anyone of claims 1 to 4, wherein the oriented polyethylene film is based on a polyethylene having a density of at least 0.935 g/cm³, a melt index of 0.5 to 20 g/10 min and a ratio of high load melt index to melt index in the range of 40 to 200.

8. The polyethylene composite film as claimed in anyone of claims 1 to 4, wherein the oriented polyethylene film is based on a linear low density polyethylene.

9. The polyethylene composite film as claimed in anyone of claims 1 to 4, wherein the oriented polyethylene film is previously subjected to vapor deposition with aluminum.

10. The polyethylene composite film as claimed in anyone of claims 1 to 4, wherein the oriented polyethylene film is previously subjected to coating with polyvinylidene chloride.

11. The polyethylene composite film as claimed in anyone of claims 1 to 4, wherein the oriented polyethylene film is blended with a petroleum resin of hydrogenation type.

12. The polyethylene composite film as claimed in anyone of claims 1 to 4, wherein the crosslinking is carried out by irradiating both the surfaces of a stock sheet with electron beam.

13. The polyethylene composite film as claimed in anyone of claims 1 to 4, wherein the lamination material has a heat shrinkage of at most 5% at 140° C.

14. The polyethylene composite film as claimed in anyone of claims 1 to 4, wherein the lamination layer has a thickness of 7 to 30 μm.

15. The polyethylene composite film as claimed in claim 2 or claim 4, wherein the sealant layer consists of a material selected from the group consisting of low density polyethylenes, linear low density polyethylenes, ethylene-vinyl acetate copolymers, ethylene-ethyl acrylate copolymers, ionomers and polypropylenes.

16. The polyethylene composite film as claimed in claim 2 or claim 4, wherein the sealant layer has a thickness of 10 to 50 μm.

17. The polyethylene composite film as claimed in claim 1, wherein the composite film has a thickness of about 20 to 300 μm.

18. A bag or vessel composed of the polyethylene composite film as claimed in anyone of claims 1 to 4.

* * * * *